United States Patent [19]

Kito et al.

[11] Patent Number: 5,122,486
[45] Date of Patent: Jun. 16, 1992

[54] METHOD OF PRODUCING SILICON-NITRIDE-BASED SINTERED BODY

[75] Inventors: Tomohisa Kito, Konan; Katsuhisa Yabuta, Komaki; Masakazu Watanabe, Nagoya, all of Japan

[73] Assignee: NGK Spark Plug Co., Ltd., Nagoya, Japan

[21] Appl. No.: 309,852

[22] Filed: Feb. 14, 1989

[30] Foreign Application Priority Data

Feb. 22, 1988 [JP] Japan .................................. 63-37402

[51] Int. Cl.$^5$ .......................... C04B 35/58; B05D 3/02
[52] U.S. Cl. .................................. 501/97; 427/376.2; 427/376.1; 427/355; 427/397.7; 264/60; 264/61; 264/62; 501/96
[58] Field of Search ................... 427/355, 376.1, 376.2, 427/397.7; 428/408, 688, 698, 704, 446; 264/60, 61, 62; 501/96, 97

[56] References Cited

U.S. PATENT DOCUMENTS

| | | | |
|---|---|---|---|
| 3,436,259 | 4/1969 | Regh et al. | 427/355 |
| 4,112,143 | 9/1978 | Alderborn et al. | 427/191 |
| 4,351,858 | 9/1982 | Hunold et al. | 427/193 |
| 4,462,816 | 7/1984 | Wolfe et al. | 427/376.2 |
| 4,462,817 | 7/1984 | Wolfe et al. | 427/376.2 |
| 4,462,818 | 7/1984 | Wolfe et al. | 427/376.2 |
| 4,692,288 | 9/1987 | Rossmann et al. | 264/62 |
| 4,812,272 | 3/1989 | Heinrich et al. | 264/62 |
| 4,853,204 | 8/1989 | Azuma et al. | 427/376.1 |

FOREIGN PATENT DOCUMENTS

| | | | |
|---|---|---|---|
| 49-119903 | 11/1974 | Japan | 427/376.1 |
| 113769 | 5/1987 | Japan . | |
| 128987 | 6/1987 | Japan . | |
| 41191 | 9/1987 | Japan . | |

*Primary Examiner*—Michael Lusignan
*Assistant Examiner*—Roy V. King
*Attorney, Agent, or Firm*—Fish & Richardson

[57] ABSTRACT

Silicon-nitride-based sintered body is produced by a primary sintering; applying a paste-like coating, in which a surface-homogenizing agent is at least one kind of inorganic constituents selected from the group consisting of C, Bn, AlN and $Si_3N_4$ provided that C is present at least 5% by weight of the inorganic constituents, on a primary sintered body; and subsequently performing a secondary sintering under a pressure higher than that at the primary sintering.

20 Claims, No Drawings

METHOD OF PRODUCING SILICON-NITRIDE-BASED SINTERED BODY

BACKGROUND OF THE INVENTION

This invention relates to a method of producing a silicon-nitride ($Si_3N_4$)-based sintered body as a high-temperature and high-strength ceramics, especially utilized as the structural material, such as automobile-engine parts or the like.

$Si_3N_4$ has high strength and high toughness, but is a material which is difficult to be sintered. Hence, various researches and proposals have been made in order to obtain a dense sintered body of $Si_3N_4$. For example, the two-step sintering method is known (JP Patent Kokoku Publication No. 62-41191 (1987)).

Further, there has also been a proposal that secondary sintering is performed with embedding a primary sintered body in a powder of a carbon-containing substance (JP Patent Kokai Publication No. 62-128987 (1987)).

SUMMARY OF THE DISCLOSURE

However, in the former, i.e., the two-step sintering method by JP Patent Kokoku Publication No. 62-41191 (1987), the pressure at secondary sintering is usually a high pressure of no smaller than 10 atm. Hence, surface properties of sintered bodies obtained become nonuniform (the appearance of uneven color), influenced by the convection of atmospheric gas or graphite molds used as saggers for sintering. This causes uneven polishing or failure in appearance. Consequently, sintering is sometimes performed while protecting sintered bodies within $Si_3N_4$ cases. In this case, however, the processing capacity of a furnace is decreased by the amount of the presence of the cases, and this results in decrease in productivity.

In the latter, i.e., the method by JP Patent Kokai Publication No. 62-128987 (1987), since carbon penetrates into a depth of about 2-3 mm in the surface layer region, properties of $Si_3N_4$ itself can not sufficiently be utilized.

It is an object of the present invention to solve such problems, i.e., to develop a production method by which it is possible to easily produce a dense sintered body having improved sinterability, especially a sintered body having uniform surface properties and color tone, and which has excellent mass-productivity.

The present inventor has eagerly made investigations from such viewpoint, and found that extremely excellent results can be obtained by forming a specific paste-like coating on a primary sintered body and subsequently performing secondary sintering, and thus completed the present invention. The present invention solves the above-described problems by the following means.

That is, the present invention provides a method of producing a silicon-nitride-based sintered body comprising a primary sintering, and a secondary sintering under a pressure higher than that at the primary sintering, said method further comprising:

applying a paste-like coating, in which a surface-homogenizing agent is at least one kind of inorganic constituents selected from the group consisting of C, BN, AlN and $Si_3N_4$ provided that C is present at least 5% by weight of the inorganic constituents on a primary sintered body; and subsequently performing a secondary sintering.

As described above, according to the present invention, success has been made to densify (provide a high density) a sintered body without decreasing sinterability, and especially to provide a high-strength $Si_3N_4$-based sintered body having excellent surface properties and appearance properties. Especially, since a high-quality $Si_3N_4$-based sintered body, even though large and complicated shape, can easily be obtained by adding a simple treatment process of forming a paste-like coating, the inventive method is a very practical production method suitable for mass production. Moreover, since $Si_3N_4$ cases become unnecessary during the secondary sintering performed under high pressure, the processing capacity of a furnace can be maintained at a high level. Hence, the present invention has an extremely high industrial value.

$Si_3N_4$-based sintered bodies produced according to the present invention can be widely utilized as various kinds of high-temperature and high-strength structural materials, such as automobile-engine parts, wear-resistant materials, cutting tools or the like, and hence are extremely useful.

Moreover, since both the primary and secondary sinterings can be performed by means of a sintering in an atmosphere where a certain amount of gas pressure is present (referred to as "gas-pressure atmosphere"), no limitation in shape exists in constrast to the cases with hot press or the like.

DESCRIPTION OF THE PREFERRED EMBODIMENTS

In order to obtain a high-strength sintered body, the α-fraction of $Si_3N_4$ powder as a raw material to be sintered is preferably no smaller than 70%, more preferably no smaller than 90%. The average grain size of the powder is preferably no larger than 5 μm, more preferably no larger than 1 μm. When the grain size exceeds 5 μm, not only sinterability is decreased, but also abnormally-grown $Si_3N_4$ grains are apt to be produced in the sintered body. This results in decrease in strength and toughness.

It is preferable that, as sintering aids, at least one kind of metal oxides, such as MgO, $Al_2O_3$, $Y_2O_3$, $CeO_2$, BeO, $ZrO_2$ or the like, are mixed. These sintering aids may also be those which can be converted into oxides during production process, i.e., salts (carbonates or the like), hydroxides or the like. The amount of sintering aids is preferably 1-15% (% by weight, the same expression holds hereafter) in total as converted into oxides, more preferably 2-6%.

The forming of the mixed powder is performed by various methods, such as press forming, extrusion or the like, and it is possible to obtain any shapes.

The sintering of the formed body must be performed, as described above, by the two-step sintering, i.e., the primary sintering (preliminary sintering) and the secondary sintering (final sintering). Both the sinterings are preferably performed by a discontinuous schedule, not by a continuous schedule. In a continuous schedule, coating process of a paste would be forced to be performed before the primary sintering (after forming or compacting), and contrary to the case in which coating is performed don a sintered body, the carbon constituent contained in the paste reacts with the formed body during the primary sintering. Hence, a satisfactory sintered body cannot be obtained. Upon applying a paste-like coating, the primary sintered body is once taken out of a sintering furnace, and is set in a furnace for the secondary sintering after a paste has been applied thereon.

The primary sintering is performed for the purpose of preventing intrusion of atmospheric gas into sintered bodies during the secondary sintering, by eliminating open pores (continuous pores) and enabling densification. For this purpose, the density of a sintered body after the primary sintering (primary sintered body) should be no smaller than 90%, more preferably no smaller than 93%. The primary sintering is preferably performed under a gas-pressure atmosphere. This is advantageous in that no limitation in shape exists compared with hot press or the like. The gas pressure of the sintering atmosphere at this time is preferably no smaller than atmospheric pressure and no larger than 20 atm, more preferably under a pressurized atmosphere of no larger than 16 atm. It is sufficient to prohibit $Si_3N_4$ from decomposition during the primary sintering, and a certain amount of the $N_2$ partial pressure should be present, which is usually satisfied by atmospheric pressure. On the other hand, under a pressure exceeding 20 atm, uniform primary sintered bodies cannot be achieved. The primary sintering is performed preferably at a temperature between 1500° and 1900° C., more preferably at a temperature between 1600° and 1800° C. Further, the gas atmosphere is preferably nitrogen atmosphere, inert gas, or a mixed gas of these gases.

A paste-like coating is formed on the resultant primary sintered body by means of performing a surface treatment by a predetermined paste-like substance. This is for the purpose of making the surface properties of the final sintered body uniform, and improving the appearance properties. The reason for performing this surface treatment after the primary sintering is, as described before, for preventing the reaction (which otherwise would occur) between the carbon constituent contained in the paste and the formed body. The paste-like substance is made by mixing surface-homogenizing agents (basic inorganic constituents) with a solvent. As the surface-homogenizing agents, as described above, at least one kind of inorganic constituents selected from the group consisting of carbon (C), boron nitride (EN), silicon nitride ($Si_3N_4$) and aluminum nitride (AlN) (provided that the content of carbon must be no smaller than 5% by weight of the total inorganic constituents) are used, in order to prevent variation in the surface properties due to the convection of the atmospheric gas and graphite molds as much as possible without deteriorating the properties of $Si_3N_4$ itself. No effect is recognized when the content of carbon is less than 5%. Especially, carbon (C) by itself or a mixture of carbon (C) and boron nitride (BN) is suitable. As carbon, there is graphite, but carbon black in an amorphous state may also be used. It is to be noted that nitrides, such as boron nitride, silicon nitride, aluminum nitride or the like, do not react with the primary sintered body and carbon in the nitrogen gas and stable, and are useful as aggregates. The specific surface area of the surface-homogenizing agents is preferably no smaller than 5 $m^2/g$, more preferably no smaller than 50 $m^2/g$. This is for the purpose of providing its effect uniformly when the agents are coated on the primary sintered body. As the solvent, either of alcohols, ketones, halogenated hydrocarbons or the like may be used, so far as they have volatile or dissipating property. Especially, ethyl alcohols having 2-3 carbon atoms, propyl alcohol, acetone and trichloroethane are preferred. The mixing ratio of the surface-homogenizing agents and the solvent is preferably 50-300 parts of the solvent against 100 parts of the surface-homogenizing agents. Further, a bonding agent (an organic binder or the like) or the like may be optionally mixed to the paste for improving uniformity of the paste coating layer, however, the amount of which should be at a minimum extent so that the uniformity can be achieved. For instance, ethylene vinyl acetate of 20 parts by weight is satisfactory. The constituents may be mixed performing wet blending by a pot mill or the like. As the method of forming a paste-like coating on the surface of the primary sintered body, it is possible to adopt various means, such as coating with brush, spraying, dipping or the like. The thickness of the coating layer may be adjustable depending on the various requirements and conditions, however, an order of 100 $\mu$m would provide sufficient effect.

Next, the primary sintered body thus subjected to the surface treatment, is subjected to the secondary sintering under a pressure which is substantially higher than that at the primary sintering. The secondary sintering is performed because it is difficult to obtain a dense sintered body only by the primary sintering. As the pressurizing method, the sintering in a gas-pressure atmosphere and the hot isostatic press sintering (HIP) are used. As the pressurizing condition, the pressure is preferably no smaller than 10 atm in order to suppress the thermal decomposition of $Si_3N_4$. The sintering temperature generally ranges from 1500°–2000° C., while the preferred temperature range depends upon the pressure at the secondary sintering. The sintering temperature can be made higher, e.g., by about 100° C. or more than the primary sintering, and thus even compositions having fewer amount of sintering aids which are not sufficiently densified by sintering under the atmospheric pressure can be densified. The pressure is more preferably no smaller than 50 atm because otherwise a too long sintering time would be required for densification.

Substantial amount of the difference in the sintering pressure should be between the primary and secondary sintering steps. The difference should be at least 9 atm (or about 10 atm), and more preferably 30 atm. As to the gas atmosphere, like at the primary sintering, there are nonoxidizing gases, i.e., nitrogen, inert gases, and a mixed gas of these gases. These gases are used for the purpose of effectively promoting the function of the surface-homogenizing agents.

The relative density of the secondary sintered body thus obtained is preferably no smaller than 97%, more preferably no smaller than 99%. Thus, as the product (polished one) after the secondary sintering, a $Si_3N_4$-based sintered body, having a high strength of 95-100 kgf·$mm^{-2}$, a uniform black color on the entire surface, and uniform characteristics, is produced. It is possible to reduce the occurrence of unevenness in strength properties due to polishing (abrasive processing, e.g., burrel polishing etc. on the surface) to an extremely small extent. Usually, the coated layer is removed to obtain the final product with uniform surface color and accompanying uniformity in the surface properties and other properties such as mechanical strength etc.

Usually, the sintering of $Si_3N_4$ is conducted in a furnace composed of an insulating carbon material using a carbon heater. Therefore, the case (or sagger) for sintering is also carbon material (e.g., graphite etc.). However, the formed $Si_3N_4$ body of a green (not-sintered) state is placed in the carbon case and sintered therein, the reaction with carbon takes place entailing volatilization of the constituents of the formed body, finally resulting in a unsatisfactory sintering with a low densification. Therefore, cases made of $Si_3N_4$ or SiC which are nonreactive with $Si_3N_4$ during the sintering are used. In the present invention, however, the primary sintered product suffers almost no reaction with the carbon which is present as the case material. Therefore there is no need to use the $Si_3N_4$ case or the like non-reactant case during the secondary sintering, i.e., the latter can be conducted in the carbon case.

$Si_3N_4$-based sintered bodies of the present invention are suitable for automobile-engine parts, such as piston valves, sliding parts, such as bearing balls, heat-engine parts, such as gas-turbine rotors.

EXAMPLES

Now, embodiments of the present invention will be hereinafter explained. Comparative examples will also be described.

A mixed powder of 3% by weight $Y_2O_3$ powder having a specific surface area of 10 $m^2/g$ and 99.9% purity, and 4% by wight $Al_2O_3$ powder having a specific surface area of 8 $m^2/g$, was admixed to 93 weight % $Si_3N_4$ powder having an average grain size of 0.8 μm and an α-fraction of 93%. Next, the dried mixed powder was formed into a prismatic shape of $10 \times 5 \times 30$ mm by a cold isostatic press under a pressure of 2 $t/cm^2$. The formed body was then placed in an $Si_3N_4$ case which was further placed within a larger graphite case, and subjected to a preliminary sintering at a temperature of 1700° C. in a nitrogen atmosphere of 2 atm for 2 hours, and a primary sintered body having a density of 94% was obtained. Subsequently, on the surface of each sample of these preliminary sintered bodies, each paste-like substance, in which 100 parts of surface-homogenizing agents having a ratio shown in the following table are mixed with 200 parts of ethanol as a solvent, was coated to a thickness of about 100 μm, respectively. It will be noted that both the BN powder and carbon black (C) as the surface-homogenizing agents had 98% purity. Next, the preliminary sintered bodies subjected to the coating processing were resintered within a graphite case under the conditions of 1800° C. and 90 atm in a nitrogen atmosphere for 1 hour, and $Si_3N_4$-based sintered bodies were obtained.

Then, the sintered bodies thus obtained were subjected to barrel polishing for 3 hours. Properties of the final sintered bodies were evaluated by the following methods. The results are shown in the following table.

(a) Relative density: Archimedes' method.

(b) Appearance: The presence of uneven color by visual inspection.

(c) Strength: Three-point flexural strength (lower span 20 mm), which substantially corresponds to JIS-R1601 except for the span length.

It is to be noted that sample Nos. 2, 4 and 6 were further polished to a depth of 0.2-0.3 mm (i.e., to a depth at which the coated layer has been completely removed), and then their strengths at room temperature (R.T.), 800° C. and 1000° C. were also investigated.

TABLE

| Sample No. | Surface-homogenizing Agents (wt %) | | | | Properties of Sintered Bodies | | | | | |
|---|---|---|---|---|---|---|---|---|---|---|
| | | | | | Relative Density** (%) | Appearance (Uneven color) | Strength (kgf/mm²) | | | |
| | | | | | | | As-sintered Surface | Polished Surface | | |
| | C | BN | $Si_3N_4$ | AlN | | | | R.T. | 800° C. | 1000° C. |
| *1 | 0 | 0 | 0 | 0 | 99.6 | Exist | 65 | — | — | — |
| *2 | 0 | 100 | 0 | 0 | 99.6 | Exist | 74 | 97 | 86 | 59 |
| *3 | 3 | 97 | 0 | 0 | 99.7 | Exist | 76 | — | — | — |
| 4 | 5 | 95 | 0 | 0 | 99.6 | No*** | 77 | 95 | 86 | 68 |
| 5 | 10 | 90 | 0 | 0 | 99.6 | No | 78 | — | — | — |
| 6 | 50 | 50 | 0 | 0 | 99.6 | No | 75 | 98 | 95 | 72 |
| 7 | 100 | 0 | 0 | 0 | 99.7 | No | 78 | — | — | — |
| 8 | 10 | 0 | 90 | 0 | 99.8 | No | 76 | — | — | — |
| 9 | 10 | 0 | 0 | 90 | 99.7 | No | 74 | — | — | — |

*Comparative examples
**relative to theoretical density
***both on as-sintered surface and polished surface As is apparent from the above table, no uneven color occurs in the sintered bodies of the embodiments (Sample Nos. 4 through 9) both in the as-sintered state and polished state. Hence, these samples maintain uniform mechanical properties. On the other hand, in each of the comparative examples (Sample Nos. 1 through 3), a part of the surface (a lower half portion which lies near the graphite case and is apt to be influenced by the graphite case) becomes black portion, and other upper portion (a portion remote from the graphite case and hardly influenced by the graphite case) becomes gray in color. This results in uneven color which entrains uneven strength. Namely, the hardness (Hv) of the black portion is about 10% higher than that of the gray portion. This results in uneven polishing. Especially, the strengths of the polished surfaces in comparative examples are remarkably decreased at 1000° C. (to about 60% by the R.T. strength at Sample No. 2). The inventive samples generally suffer less decrease at 1000° C. to about 70% or more of the R.T. strength. For instance Sample Nos. 4 and 6 show less amount of decrease, i.e., 72% and 73%, respectively, at 1000° C. from the R.T. strength. Note that the as-sintered strength is lower than the polished strength. This difference is believed to be caused by the pressure of a rough surface irregularity and pin holes on the as-sintered surface.

It should be understood that modification in the art may be made without departing from the gist and scope of the present invention as disclosed in the entire disclosure and claimed hereinbelow.

What is claimed is:

1. A method of producing a silicon-nitride-based sintered body comprising a primary sintering, and a secondary sintering under a pressure higher than that of the primary sintering, said method further comprising:
   applying a coating of a powdery surface-homogenizing agent in a paste form, in which the surface-homogenizing agent is at least two kinds of inorganic constituents selected from the group consisting of C, BN, AlN, and $Si_3N_4$, provided that C is present in at least 5% by weight of the inorganic constituents, on a primary silicon-nitride-based sintered body; and subsequently performing a secondary sintering, wherein said primary sintering is performed until the relative density reaches a value of no less than 90% of theoretical density and said secondary sintering is performed under a gas pressure of no less than 10 atm and until the relative density reaches a value of no less than 97% of theoretical density.

2. The method of producing a silicon-nitride-based sintered body according to claim 1, wherein said paste-like coating consists essentially of the surface-homogenizing agent and a solvent.

3. The method of producing a silicon-nitride-based sintered body according to claim 1, wherein the surface-homogenizing agent has a specific surface area of no smaller than 5 m$^2$/g.

4. The method of producing a silicon-nitride-based sintered body according to claim 3, wherein the surface-homogenizing agent has a specific surface area of no smaller than 50 m$^2$/g.

5. The method of producing a silicon-nitride-based sintered body according to claim 1, wherein said secondary sintering is performed under a gas pressure of no smaller than 50 atm.

6. The method of producing a silicon-nitride-based sintered body according to claim 1, wherein the primary sintering is performed under a gas pressure between atmospheric pressure and 20 atm.

7. The method of producing a silicon-nitride-based sintered body according to claim 1, wherein the primary sintering is performed until the relative density reaches a value of no smaller than 93%.

8. The method of producing a silicon-nitride-based sintered body according to claim 1, wherein the primary sintering is performed at a temperature between 1500° C. and 1900° C.

9. The method of producing a silicon-nitride-based sintered body according to claim 1, wherein the secondary sintering is performed at a temperature between 1500° C. and 2000° C.

10. The method of producing a silicon-nitride-based sintered body according to claim 1, wherein the secondary sintering is performed by means of sintering in a gas-pressure atmosphere or a hot isostatic press sintering (HIP).

11. The method of producing a silicon-nitride-based sintered body according to claim 1, wherein the secondary sintering is performed until the relative density reaches a value of no smaller than 99%.

12. The method of producing a silicon-nitride-based sintered body according to claim 1, wherein the primary and secondary sintering are performed by means of sintering in a gas-pressure atmosphere.

13. The method of producing a silicon-nitride-based sintered body according to claim 1, wherein the primary sintered body contains 1-15% by weight sintering aids as measured converted into oxides.

14. The method of producing a silicon-nitride-based sintered body according to claim 6, wherein the secondary sintering is effected under a pressure by 9 atm higher than the primary sintering.

15. The method of producing a silicon-nitride-based sintered body according to claim 6, wherein the secondary sintering is effected under a pressure by 30 atm higher than the primary sintering.

16. The method of producing a silicon-nitride-based sintered body according to claim 1, wherein the process further comprises polishing the resultant product of the secondary sintering until a layer on said product resulting from the primary and secondary sintering of said coating is removed.

17. A product of the process according to claim 1, which has a uniform surface color.

18. A product of the process according to claim 16, which has a uniform surface color and mechanical property.

19. A method of producing a silicon-nitride-based sintered body comprising a primary sintering and a secondary sintering under a pressure higher than that of the primary sintering, said method further comprising:

applying a coating of a powdery surface-homogenizing agent comprising a mixture of carbon and boron nitride in a paste form, provided that C is present in at least 5% by weight of the surface-homogenizing agent, on a primary silicon-nitride-based sintered body; and subsequently performing a secondary sintering, wherein said primary sintering is performed until the relative density reaches a value of no less than 90% of theoretical density and said secondary sintering is performed under a gas pressure of no less than 10 atm and until the relative density reaches a value of no less than 97% of theoretical density.

20. The method of producing a silicon-nitride-based sintered body according to claim 19, further comprising sintering aids which are at least one kind of oxides selected from the group consisting of MgO, Al$_2$O$_3$, Y$_2$O$_3$, CeO$_2$, BeO and ZrO$_2$.

* * * * *